US012115507B2

(12) United States Patent
Crashley

(10) Patent No.: US 12,115,507 B2
(45) Date of Patent: Oct. 15, 2024

(54) MIXING ACCESSORY

(71) Applicant: Paula J. Crashley, New Tripoli, PA (US)

(72) Inventor: Paula J. Crashley, New Tripoli, PA (US)

( * ) Notice: Subject to any disclaimer, the term of this patent is extended or adjusted under 35 U.S.C. 154(b) by 156 days.

(21) Appl. No.: 17/408,210

(22) Filed: Aug. 20, 2021

(65) Prior Publication Data

US 2023/0055906 A1 Feb. 23, 2023

(51) Int. Cl.

*B01F 27/07* (2022.01)
*B01F 23/53* (2022.01)
*B01F 27/1125* (2022.01)
*B01F 35/32* (2022.01)
*B01F 27/072* (2022.01)

(52) U.S. Cl.

CPC ............ *B01F 27/071* (2022.01); *B01F 23/53* (2022.01); *B01F 27/11251* (2022.01); *B01F 35/325* (2022.01); *B01F 27/0725* (2022.01)

(58) Field of Classification Search

CPC .. B01F 27/071; B01F 27/11251; B01F 33/86; B01F 35/411; B01F 35/325; B01F 31/44; B01F 31/441; B01F 31/443

See application file for complete search history.

(56) References Cited

U.S. PATENT DOCUMENTS 2,637,537 A * 5/1953 Arthur ................. A47J 43/0711 416/201 A
4,054,272 A * 10/1977 Cooke ................. B01F 27/0724 D15/147
4,298,134 A * 11/1981 Lewis, Jr. ................ B44D 3/12 220/792
4,387,828 A * 6/1983 Yates, Jr. ........... B65D 43/0212 220/792
6,258,394 B1 * 7/2001 Hochstein ........... B01F 33/5011 426/393
8,960,999 B1 * 2/2015 Ochoa ................... B01F 27/806 366/244
9,084,971 B1 * 7/2015 Villasenor ............ B01F 27/091

(Continued)

FOREIGN PATENT DOCUMENTS

KR 20180004644 A * 1/2018

OTHER PUBLICATIONS

Chen, Rae. "Philips One by Sonicare battery toothbrush review". In Best Buy Blog [online]. Apr. 21, 2021 [retrieved on Sep. 15, 2023]. Retrieved from the internet: <https://blog.bestbuy.ca/fitness-luggage-fashion/health-wellness-fitness-luggage-fashion/philips-one-by-sonicare-battery-toothbrush-review>. (Year: 2021).*

(Continued)

*Primary Examiner* — Marc C Howell
*Assistant Examiner* — Patrick M McCarty
(74) *Attorney, Agent, or Firm* — Sterne, Kessler, Goldstein & Fox P.L.L.C.

(57) ABSTRACT

An apparatus for mixing is disclosed. In embodiments, the apparatus includes a head, a shaft, and a base. In embodiments, the shaft couples to the head and includes a first opening at a bottom portion of the shaft. In embodiments, the base couples to the bottom portion of the shaft and includes a second opening that extends through the base and is aligned to the first opening. In embodiments, the first and second openings are configured to receive a reciprocating motor shaft.

20 Claims, 11 Drawing Sheets

(56) References Cited

U.S. PATENT DOCUMENTS

| | | | | |
|---|---|---|---|---|
| 9,561,546 | B1 * | 2/2017 | Walter | B23B 39/00 |
| 10,154,758 | B2 * | 12/2018 | Ochoa | B01F 23/53 |
| 10,959,512 | B2 * | 3/2021 | Schuster | A46B 15/0055 |
| 11,202,999 | B1 * | 12/2021 | Harrison, Jr. | B01F 27/11251 |
| 11,389,942 | B1 * | 7/2022 | Stoltz | B25G 1/005 |
| 2001/0002891 | A1 * | 6/2001 | Frankel | A47J 43/0722 426/570 |
| 2006/0021512 | A1 * | 2/2006 | Ghidini | A47J 31/20 99/275 |
| 2007/0086271 | A1 * | 4/2007 | Hamilton | B01F 33/5011 366/326.1 |
| 2008/0094938 | A1 * | 4/2008 | Waggoner | B01F 27/88 366/328.2 |
| 2009/0135668 | A1 * | 5/2009 | Hamilton | B01F 33/5011 366/343 |
| 2009/0266240 | A1 * | 10/2009 | Elissen | A47J 36/165 99/323.3 |
| 2010/0192785 | A1 * | 8/2010 | Krauchi | A47J 43/0465 99/453 |
| 2011/0083288 | A1 * | 4/2011 | Kressner | A61C 17/222 15/22.1 |
| 2011/0317511 | A1 * | 12/2011 | Dobay | B01F 27/11251 366/130 |
| 2013/0064941 | A1 * | 3/2013 | Taitler | A47J 31/4485 219/679 |
| 2013/0233898 | A1 * | 9/2013 | Resnikoff | A47G 19/2272 222/568 |
| 2015/0297020 | A1 * | 10/2015 | Castelli | A47J 31/4489 99/287 |
| 2017/0021315 | A1 * | 1/2017 | Rukavina | B01F 27/906 |
| 2017/0027187 | A1 * | 2/2017 | Monteith | A47J 43/0711 |
| 2019/0053649 | A1 * | 2/2019 | Novak | A47G 19/2266 |
| 2020/0055011 | A1 * | 2/2020 | Venables | B01F 35/3204 |

OTHER PUBLICATIONS

HK Sanyan Trading Co. “Electric Milk Frother with 2-Springs Whisk Cleaning Brush and Stand”. In Sanyan-trading.com [online]. Nov. 22, 2019. [retrieved on Sep. 15, 2023]. Retrieved from the internet: <https://web.archive.org/web/20191122093935/http://eshop.sanyan-trading.com/milk-frother-sy-rmf-01101> (Year: 2019).*

* cited by examiner

1100

MIXING ACCESSORY

FIELD

Embodiments relate to a mixing accessory, specifically an apparatus configured to receive a motor shaft for mixing solids and/or liquids.

BACKGROUND

A device can be used to mix solids, liquids, or a combination thereof. The mixing device can be a single piece of rigid material, in which the solid, liquid, or a combination thereof is mixed by hand using the mixing device. Due to its single-piece rigid structure, the entire mixing device must be replaced once it breaks. Moreover, due to its single-piece rigid structure, the mixing device is not customizable.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the disclosure.

DETAILED DESCRIPTION

Figure 1:
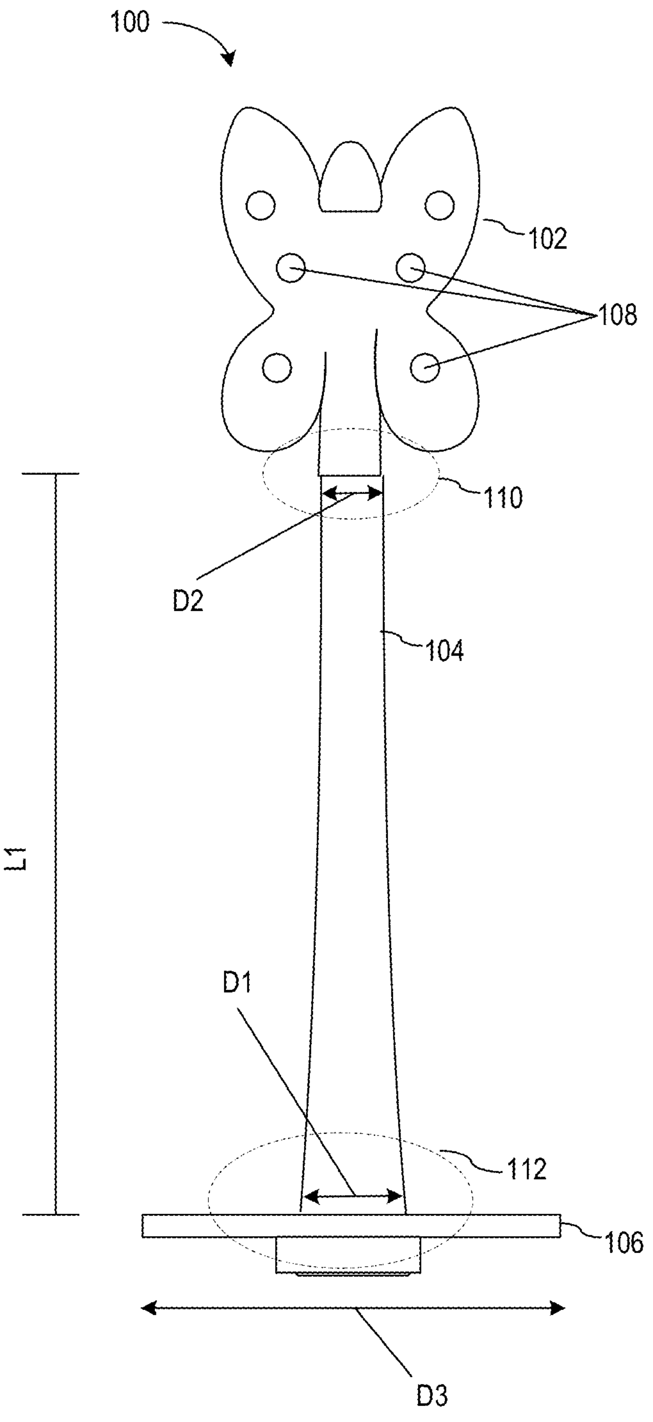
FIG. 1 is a front view of an apparatus for mixing, in some embodiments of the present disclosure.

Embodiments disclosed herein provide a novel mixing accessory. In embodiments, the mixing accessory includes a head, a shaft, and a base. In embodiments, the shaft couples to the head and includes a first opening at a bottom portion of the shaft. In embodiments, the base couples to the bottom portion of the shaft and includes a second opening that extends through the base and is aligned to the first opening. In embodiments, the first and second openings are configured to receive a reciprocating motor shaft. In embodiments, a fastening mechanism is configured to attach the head to the shaft. In embodiments, an additional fastening mechanism is configured to attach the shaft to the base. In embodiments, the head can be a variety of shapes, for example a butterfly shape, and can include one or more holes to allow a liquid, a solid, or a combination thereof to pass through. In embodiments, the shaft can have a variety of shapes, for example a rod shape. In embodiments, the base can be a variety of shapes, for example a disc shape. In embodiments, the head, shaft, and base can be detachable from one another. In embodiments, the head, shaft, and base can form solid pieces. For example, the head and the shaft can form a single solid piece. In embodiments, the shaft and base can form a solid piece. In embodiments, the base can further include a core section and a plate surrounding the core section, where the plate has a diameter larger than that of the core section. In embodiments, the head, shaft, and base can be made of a common material. In embodiments, the head, shaft, and base can be made of different materials. In embodiments, the materials can be, for example, a metal, a plastic, a rubber, or a composite material. In embodiments, the first opening of the shaft can be disposed within a central section of the bottom portion of the shaft and can be configured to receive the reciprocating motor shaft. In embodiments, the first opening can include a locking mechanism to secure the reciprocating motor shaft.

Further embodiments provide a method of manufacturing an apparatus for mixing. In embodiments, the method includes forming a head. In embodiments, the method includes forming a shaft configured to couple to the head. A bottom portion of the shaft includes a first opening. In embodiments, the method includes forming a base configured to couple to the bottom portion of the shaft. The base includes a second opening that extends through the base and is aligned to the first opening, where the first and second openings are configured to receive a reciprocating motor shaft. In embodiments, the method can further include forming the head to have one or more holes to allow a liquid, a solid, or a combination thereof to pass through. In embodiments, the method can further include forming the first opening to include a locking mechanism to secure the reciprocating motor shaft to the shaft. In embodiments, the method can further include forming the base to have a core section and a plate surrounding the core section, where the plate has a diameter larger than that of the core section.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring embodiments of the present disclosure, some configurations and process steps are not disclosed in detail.

The drawings showing embodiments of the apparatus are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

FIG. 1. shows a front view of an apparatus 100 for mixing, in some embodiments of the present disclosure. In embodiments, the apparatus 100 can include a head 102, a shaft 104, and a base 106. In embodiments, the head 102 can couple to the shaft 104. In embodiments, the shaft 104 can couple to the base 106.

In embodiments, the head 102 can couple to the shaft 104 via a fastening mechanism 110. In embodiments, the fastening mechanism 110 can attach a bottom portion of the head 102 to a top portion of the shaft 104. The fastening mechanism 110 can employ any number of techniques to attach the head 102 to the shaft 104. For example, the fastening mechanism 110 can include a screw mechanism in which the shaft 104 and head 102 can screw into one another. In some embodiments, the fastening mechanism 110 can include any number of locking mechanisms in which the shaft 104 and/or the head 102 can interlock into one another. This can be, for example, via one or more latches and/or interlocking teeth that can interlock into one another when the head 102 and the shaft 104 are pressed together. In embodiments, corresponding latches and/or interlocking teeth can be located at the bottom portion of the head 102 and the top portion of the shaft 104, and can interlock when the head 102 and the shaft 104 are pressed together to secure the head 102 to the shaft 104. In embodiments, the corresponding latches and/or interlocking teeth can be part of a mechanism in which latches and/or interlocking teeth are within an internal chamber located within the head 102 or the shaft 104, and can interlock into corresponding latches and/or interlocking teeth of a rod portion of either the head 102 or the shaft 104 when the rod portion is inserted into the internal chamber of the head 102 or the shaft 104.

In embodiments, the shaft 104 can couple to the base 106 via a fastening mechanism 112. In embodiments, the fastening mechanism 112 can operate in a similar manner as the fastening mechanism 110. In some embodiments, the fastening mechanism 112 can employ a technique to secure the shaft 104 to the base 106 by allowing the bottom portion of the shaft 104 to be inserted, via a second opening that extends through the base 106. In embodiments, the shaft 104 can be secured based on the shaft 104 exerting an outward pressure on the base 106 and the base 106 exerting an inward pressure on the shaft 104. The corresponding pressures can be a result of the size of the diameters of the second opening and the bottom portion of the shaft 104 and can further depend on what materials are used to form the shaft 104 and the base 106. For example, in some embodiments, the diameter of the second opening can be smaller than the diameter of the bottom portion of the shaft 104 but sufficiently sized so that the bottom portion of the shaft 104 can be inserted into the second opening. Additionally, and in some embodiments, the shaft 104 and/or the base 106 can be made of a plastic, a rubber, or a composite material that can be flexible such that the material can stretch and contract to allow the bottom portion of the shaft 104 to be inserted into the second opening. In some embodiments, once inserted into the second opening, the bottom portion of the shaft 104 can exert outward pressure on base 106, and similarly the base 106 can exert an inward pressure on the bottom portion of the shaft 104, such that the pressures exerted can secure the base 106 and the shaft 104 to one another.

In embodiments, the head 102, shaft 104, and base 106 can have a variety of shapes and sizes. For example, as shown in FIG. 1, the head 102 has a butterfly shape. In some embodiments, the head 102 can be a variety of geometric shapes, such as a circle, square, a rectangle, a triangle, and a polygon. In embodiments, the head 102 can include one or more holes 108 to allow a liquid, a solid, or a combination thereof to pass through. In some embodiments, the one or more holes 108 in the head 102 allows for the apparatus 100 to improve the mixing of liquids and solids, by allowing the liquids and solids to interact with one another more frequently during the mixing process.

In embodiments, the shaft 104 can have a variety of shapes and sizes. For example, as shown in FIG. 1, the shaft 104 can have a rod shape. In embodiments, the shaft 104 can have a length (L1) that can be customized. In embodiments, the length can less than or equal to 12 inches. In embodiments, the shaft 104 can be divided into sections, which can be coupled to one another. In embodiments, each of these sections can have a length less than or equal to 12 inches. In this way, the length of the shaft 104 can be adjusted by stacking sections of the shaft 104 together.

In embodiments, the shaft 104 can have a bottom portion with a larger diameter than that of its top portion. In FIG. 1, the larger diameter is labeled D1 and the smaller diameter is labeled D2. In embodiments, the shaft 104 can have a bottom portion with the same diameter as that of its top portion (i.e., D1 equals D2). In embodiments, D1 can have a diameter of less than or equal to 13⁄16 of an inch. In embodiments, D2 can have a diameter of less than or equal to ½ of an inch.

In embodiments, the base 106 can have a variety of shapes and sizes. For example, the base 106 can have a disc shape. In embodiments, the disc shape can include a core section and a plate surrounding the core section. In embodiments, a diameter of the core section can be smaller than that of the plate surrounding the core section. In FIG. 1, the diameter of the plate surrounding the core section is labeled D3. In embodiments, the core section can be hollow and include the second opening. In embodiments, the core section can have a diameter less than or equal to 13⁄16 of an inch. In some embodiments, the bottom portion of the shaft 104 can be inserted into the core section/second opening to couple the shaft 104 to the base 106. The plate surrounding the core section can prevent solids and liquids from splashing outside of a vessel in which the liquids and solids are being mixed in during the mixing process. In embodiments, the plate surrounding the core section (D3) can have a diameter less than or equal to 4 inches. In some embodiments, the base 106 can have other shapes, including a square, a rectangle, and an oval, each shape having a similar core section and plate surrounding the core section. In embodiments, the base can have a thickness. In embodiments, the thickness can be less than or equal to 5⁄32 of an inch.

In embodiments, the head 102, shaft 104, and base 106 can be formed by a number of manufacturing techniques, such as casting and molding, machining, joining, shearing and forming, 3-dimensional (3D) printing, or a combination thereof. In embodiments, the head 102, shaft 104, and base 106 can be formed from a variety of materials. For example, the head 102, shaft 104, and base 106 can be made of a metal, a plastic, a rubber, or a composite material. In embodiments, the material can be flexible or rigid. In embodiments, the head 102, shaft 104, and base 106 can be made of a common material. In some embodiments, the head 102, shaft 104, and base 106 can be made of different materials. For example, the head 102, shaft 104, and base 106 can all be made of a plastic material. In some embodiments, the head 102 and shaft 104 can be made of a metal, while the base 106 can be made of a plastic, a rubber, or a composite material. The aforementioned materials are merely examples, and any combination of materials can be used to form the head 102, shaft 104, or base 106. In embodiments, the head 102, shaft 104, and base 106 can form solid pieces. For example, the head 102 and the shaft 104 can be formed as a single solid piece (e.g., the head 102 and shaft 104 can be formed from one mold and from the same metal, plastic, rubber, or composite material).

Figure 2:
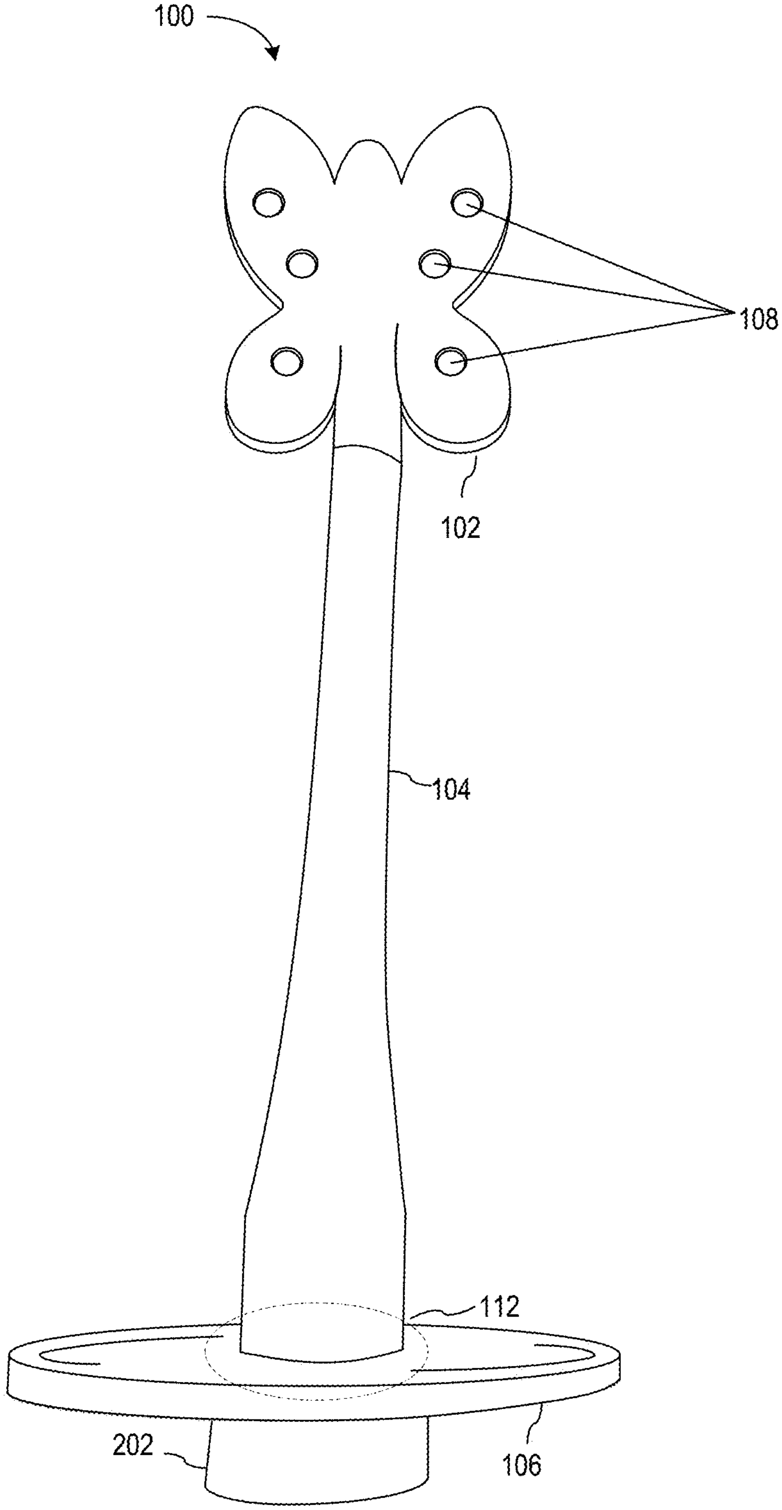
FIG. 2 is a three dimensional view of the apparatus of FIG. 1, in some embodiments of the present disclosure.

FIG. 2 shows a three dimensional view of the apparatus 100, in some embodiments of the present disclosure. In FIG. 2, the base 106 has a disc shape, in some embodiments of the present disclosure. The base 106 has a portion 202 extending from the bottom of the base 106. In embodiments, the portion 202 can define a boundary of the core section of the base 106. In embodiments, the shaft 104 can be coupled to the base 106 by inserting it into the core section, thereafter being surrounded by the portion 202. In embodiments, the portion 202 can secure the shaft 104 to the base 106 by being part of the fastening mechanism 112 and exerting an inward pressure on the bottom portion of the shaft 104. In embodiments, if a screw mechanism is used to secure the shaft 104 to the base 106, the portion 202 can have a screw path formed within the inner walls of the portion 202 to allow the bottom portion of the shaft 104 to be screwed into the base 106.

Figure 3:
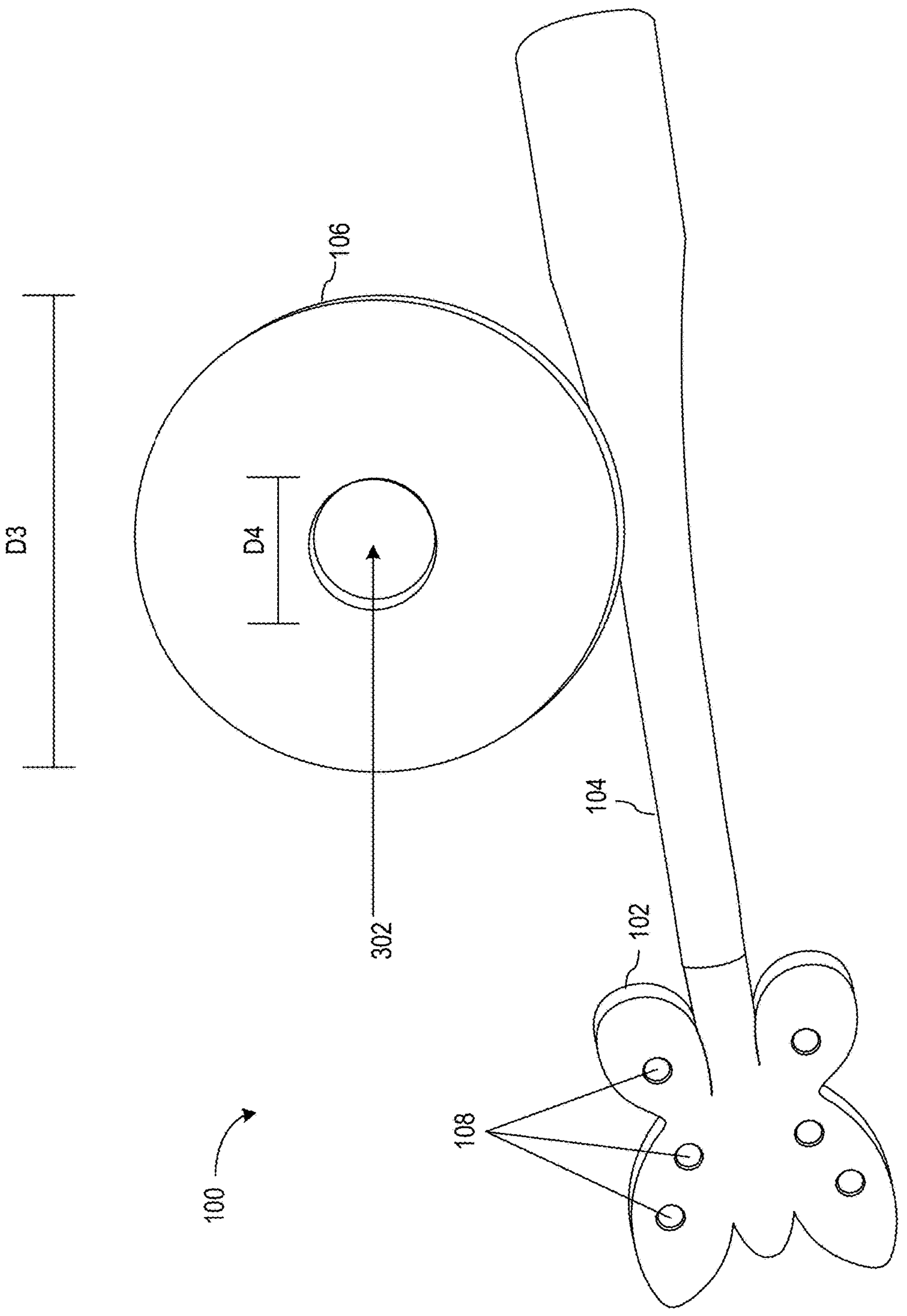
FIG. 3 is a view of the apparatus of FIG. 1 showing a detached base, in some embodiments of the present disclosure.

FIG. 3 illustrates a view of the apparatus 100 showing its base 106 detached from its shaft 104 and head 102, in some embodiments of the present disclosure. FIG. 3 also illustrates the relationship between the core section of the base 106 and the plate surrounding the core section. In FIG. 3, the core section of the base is labeled 302 and shows a hallowed out portion of the base 106 which forms the core section 302. As shown in FIG. 3, and as described with respect to FIG. 1, in embodiments, the core section 302 and a plate surrounding the core section can have different diameters. FIG. 3 shows the relationship between the diameters of the core section and the plate, where the plate has a diameter D3 (as previously indicated with respect to FIG. 1) that is larger than a diameter D4 of the core section 302. In embodiments, D3 can have a diameter less than or equal to 4 inches. In embodiments, D4 can have a diameter less than or equal to 13/16 of an inch.

Figure 4:
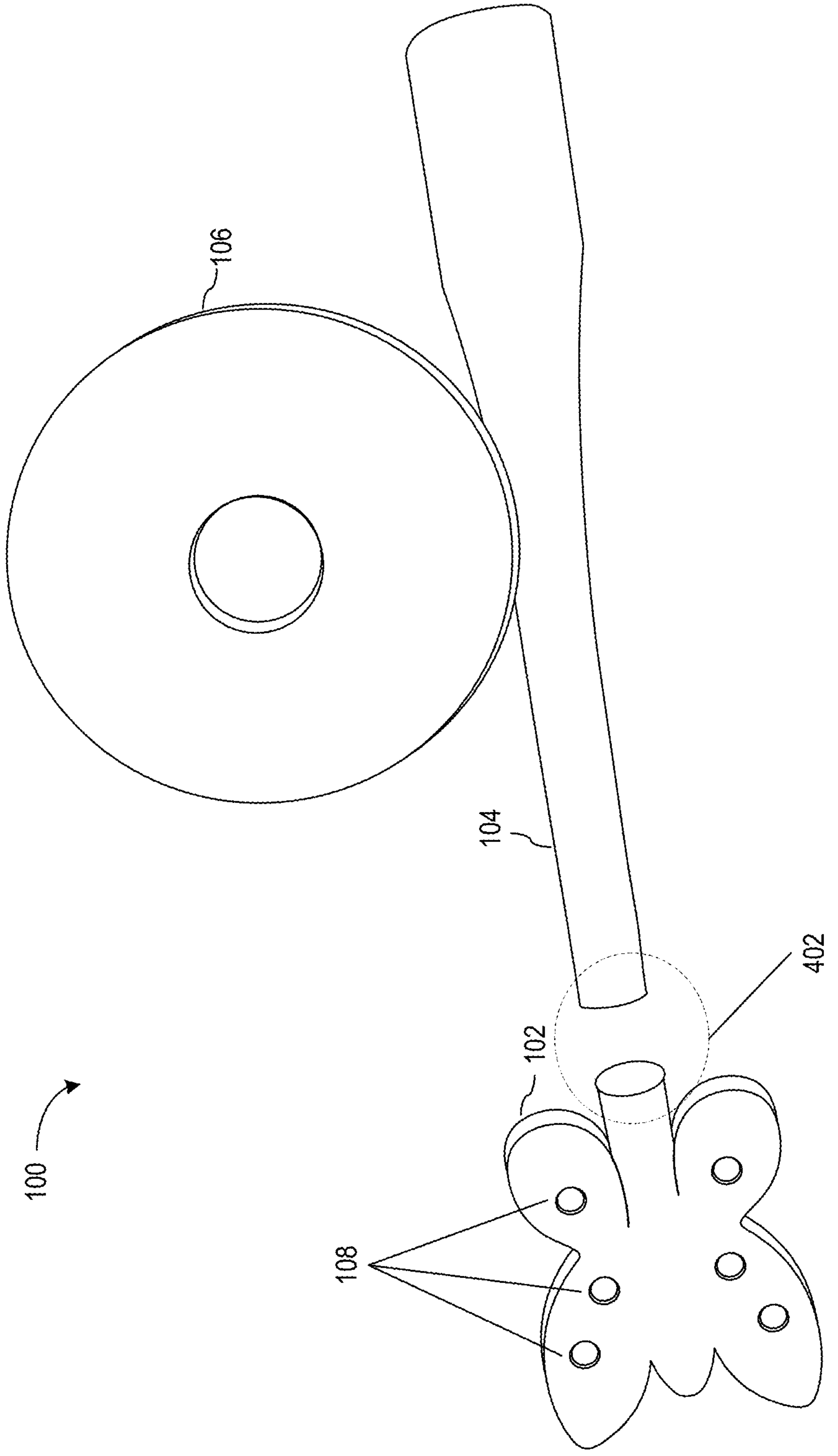
FIG. 4 is a view of the apparatus of FIG. 1 showing detached base, head, and shaft, in some embodiments of the present disclosure.

FIG. 4 illustrates a view of the apparatus 100 showing its base 106, head 102, and shaft 104 detached from one another, in some embodiments of the present disclosure. For example, the bottom portion of the head 102 can be detached from the top portion of the shaft 104, as shown in a dotted section labeled 402. In embodiments, the head 102, shaft 104, and base 106 can further be reattached or coupled to one another via the fastening mechanism 110 and the fastening mechanism 112, as previously shown and described with respect to FIG. 1. The ability to detach and reattach the base 106, head 102, and shaft 104 allows the apparatus 100 to have replaceable components such that any one of the base 106, head 102, or shaft 104 can be replaced if one or more of these components breaks, or otherwise needs to be swapped out, according to some embodiments. This is particularly useful in situations where a different shaped head 102 is desired, a different length shaft 104 is desired, or a different shaped base 106 is desired. This characteristic further adds to the ability to customize the apparatus 100 to the particular application and/or desired aesthetic look for the apparatus 100.

Figure 5:
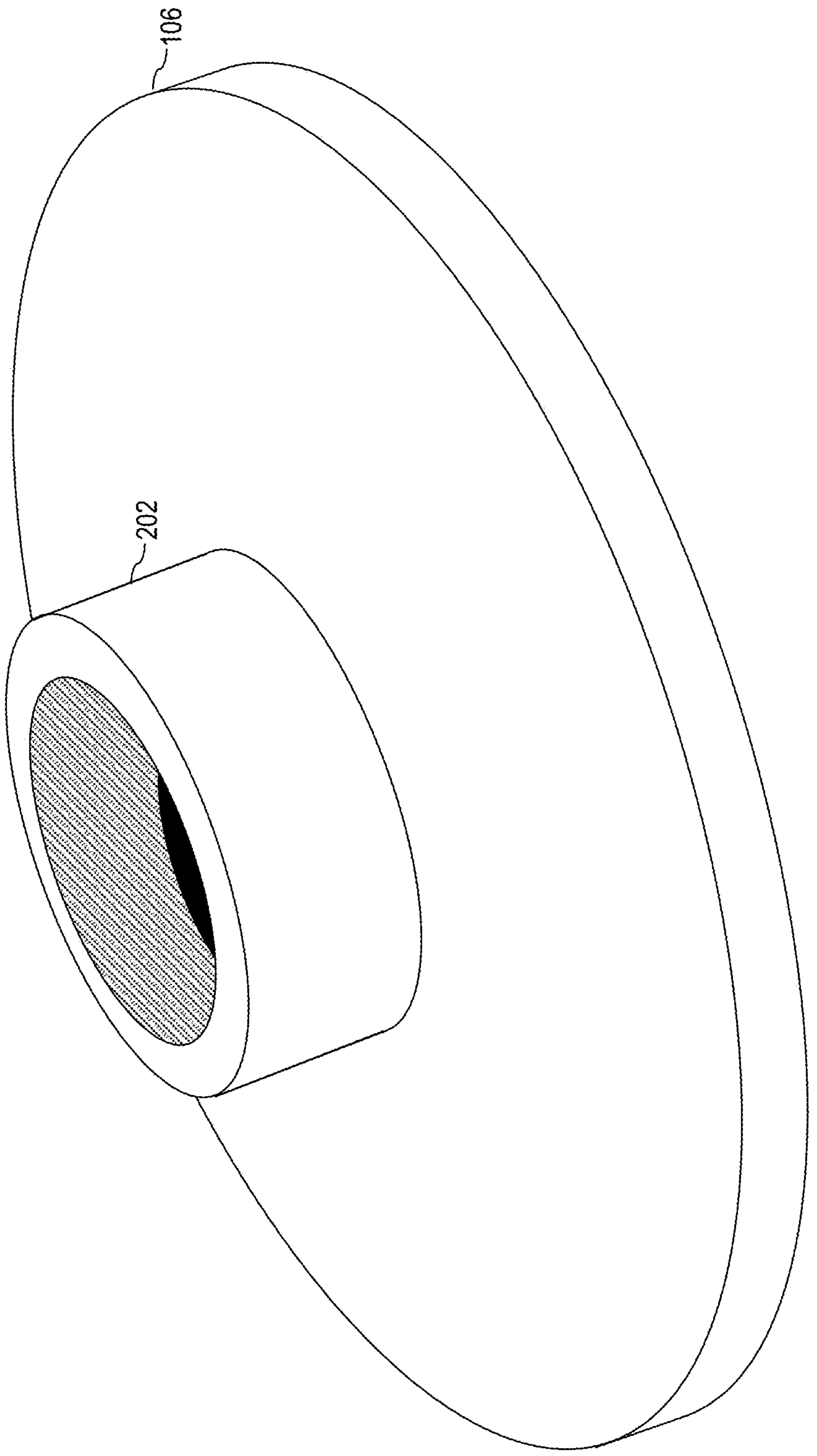
FIG. 5 is a view of a base, in some embodiments of the present disclosure.

FIG. 5 shows a further view of the base 106, in some embodiments of the present disclosure. FIG. 5 shows a close up view of the portion 202 of the base 106, in some embodiments of the present disclosure.

Figure 6:
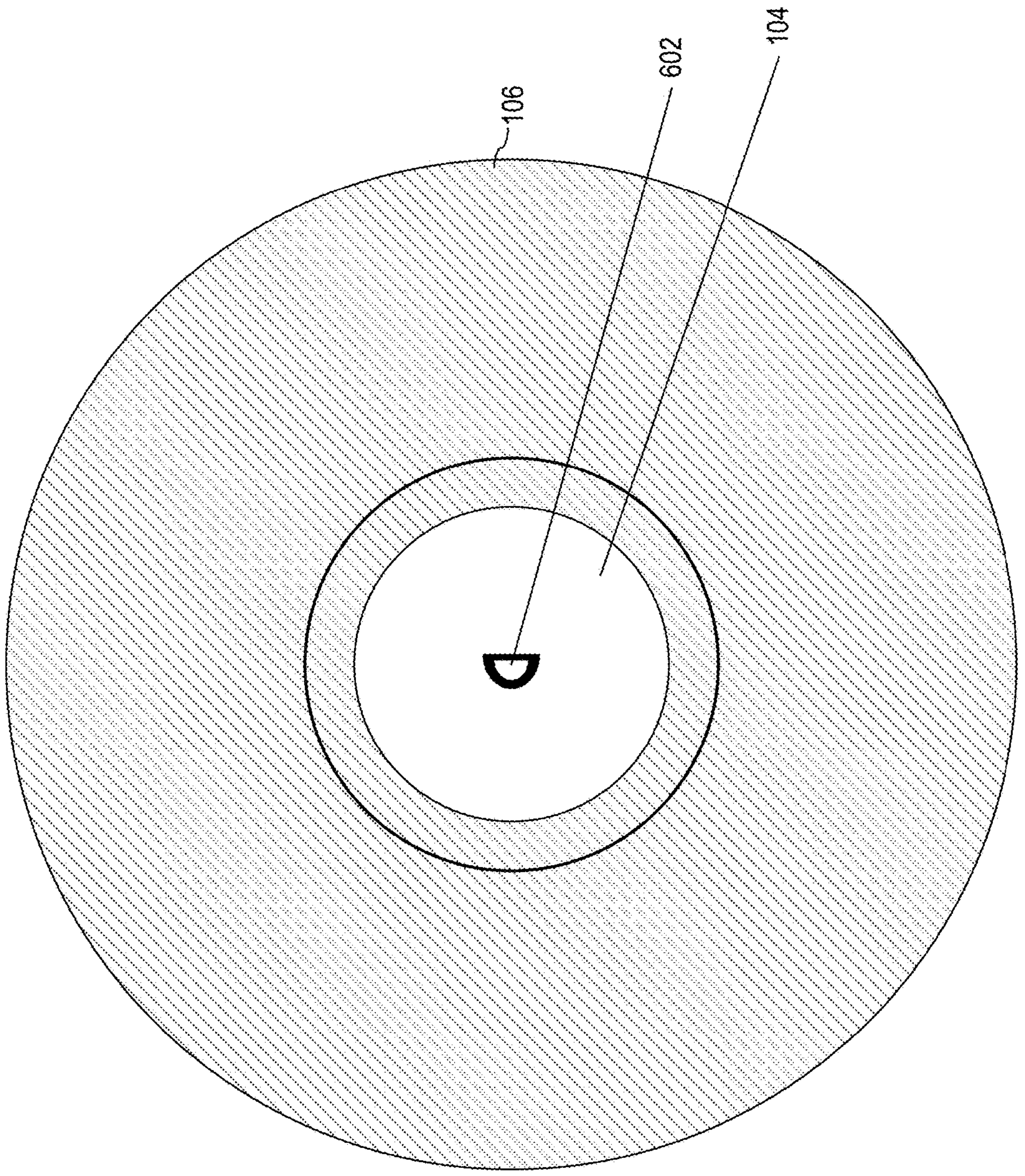
FIG. 6 is a bottom view of the apparatus of FIG. 1 showing its base coupled to a bottom portion of the shaft through a second opening that extends through the base, in some embodiments of the present disclosure.

FIG. 6 illustrates a bottom view of the apparatus 100 showing its base 106 coupled to a bottom portion of the shaft 104 through the second opening that extends through the base 106, in some embodiments of the present disclosure. FIG. 6 shows the apparatus 100 with the shaft 104 having a first opening 602 at the bottom portion of the shaft 104, in some embodiments of the present disclosure. In embodiments, the first opening 602 can be disposed within a central section of the bottom portion of the shaft 104. In embodiments, the purpose of the first opening 602 is to receive a reciprocating motor shaft. In embodiments, the reciprocating motor shaft can provide the mechanism which allows the apparatus 100 to perform the mixing of solids and liquids. For example, the reciprocating motor shaft can be an extended piece (e.g., a rod shaped metal piece) of an electric toothbrush, a drill, or any other device that can provide rotational and/or vibrational forces that allows the reciprocating motor shaft to rotate and/or vibrate. In embodiments, the reciprocating motor shaft can be inserted into the first opening and can be secured into the central section of the bottom portion of the shaft 104. In embodiments, the reciprocating motor shaft can exert rotational and/or vibrational forces on the shaft 104. As a result of the rotational and/or vibrational forces exerted by the reciprocating motor shaft on the shaft 104, the apparatus 100 is able to rotate and/or vibrate, thus allowing the apparatus 100 to mix the solids and liquids.

In embodiments, the first opening 602 can be formed to fit any number of reciprocating motor shafts of any number of devices. For example, the first opening can be formed to fit a reciprocating motor shaft of an electric toothbrush. For example, the electric toothbrush can be manufactured by Oral-B™, Sonicare™, Philips™, or other similar manufacturers. Those skilled in the art will recognize that these electric toothbrushes can have detachable brush heads, which can be secured to the body of the electric toothbrush by a reciprocating motor shaft (e.g., a rod shaped metal piece). In embodiments, the first opening 602 can be formed to allow the reciprocating motor shaft of such a toothbrush to be inserted into the shaft 104. Similarly, the first opening 602 can be formed to allow a drill head to be inserted such that the apparatus 100 can be rotated by a drill. In some embodiments, the drill head can be, for example, a Philips drill head (shaped like a “star”) or a flat drill head. In some embodiments, the first opening 602 can be shaped to fit the drill head, for example, be shaped to accept the Philips (e.g., be “star” shaped) or flat drill head (e.g., be elongated in a substantially rectangular shape to accept the flat drill head). The aforementioned are merely exemplary and other shapes can be used for the first opening 602 including circles, triangles, squares, polygons, etc. In embodiments, the first opening 602 can have a diameter less than or equal to ¼ of an inch.

Figure 7:
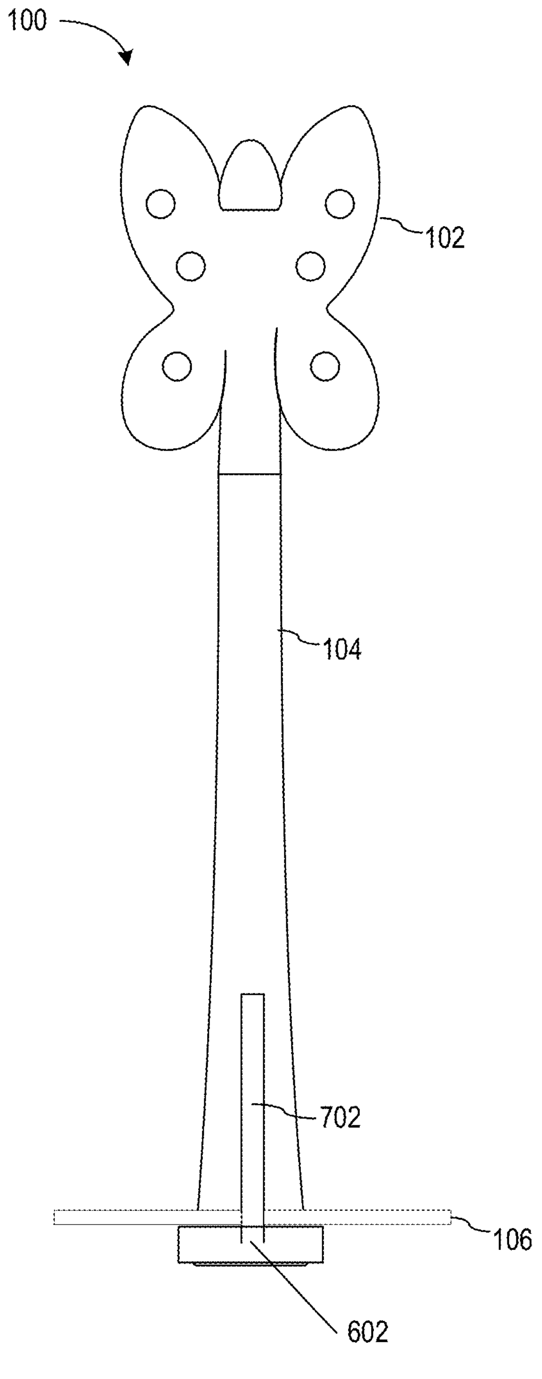
FIG. 7 is a view of the apparatus of FIG. 1 showing an opening disposed within a central section of the bottom portion of the shaft, in some embodiments of the present disclosure.

FIG. 7 is a view of the apparatus 100 showing the first opening 602 disposed within the central section of the bottom portion of the shaft 104, in some embodiments of the present disclosure. FIG. 7 shows a chamber 702 within the shaft 104 and in which the reciprocating motor shaft discussed with respect to FIG. 6 can be inserted to provide the vibrational and/or rotational forces on the apparatus 100 to allow it to perform the mixing. In embodiments, the chamber 702 can have a length less than or equal to 1.5 inches.

Figure 8:
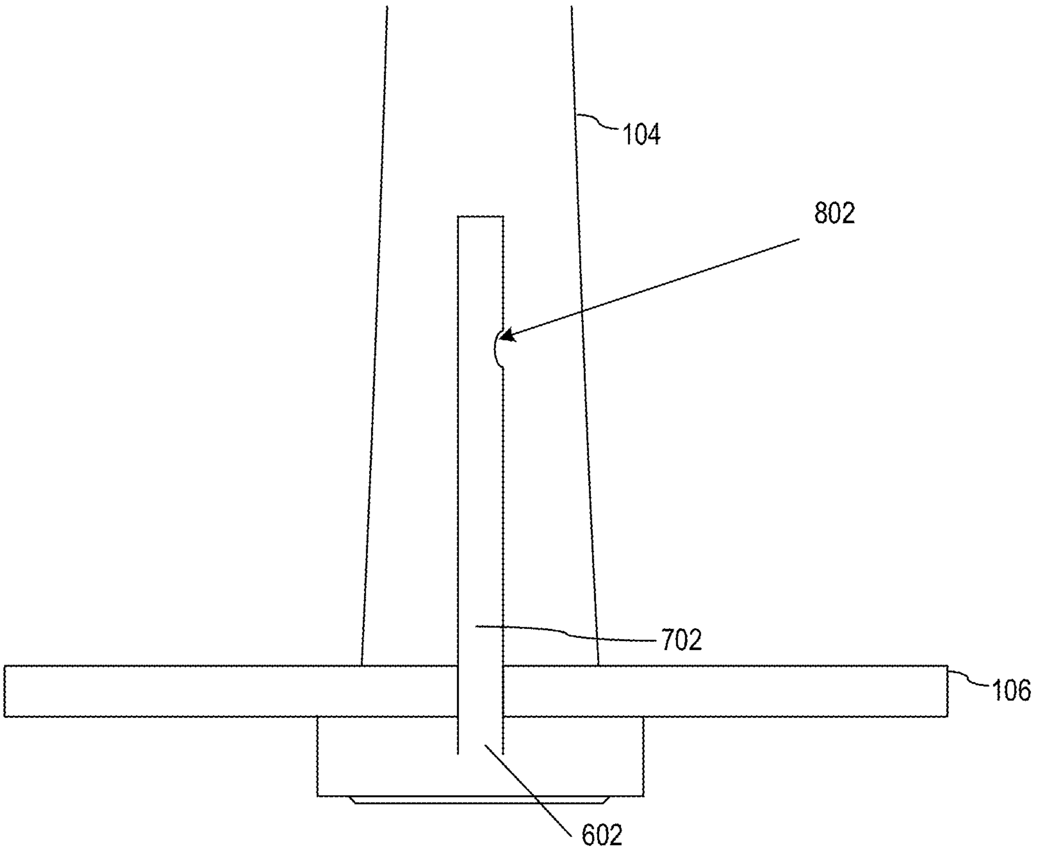
FIG. 8 is a view of the apparatus of FIG. 1 showing an example locking mechanism in an opening, in some embodiments of the present disclosure.

FIG. 8 is a view of the apparatus 100 showing an example locking mechanism in the first opening 602, in some embodiments of the present disclosure. The example locking mechanism shown in FIG. 8 allows the reciprocating motor shaft to be secured to the shaft 104 via a latch 802. In embodiments, the latch 802 can be any notch, clasp, and hook to secure the reciprocating motor shaft to the shaft 104. In embodiments, the latch 802 can be manufactured to fit the type of reciprocating motor shaft it is to secure. For example, if the reciprocating motor shaft is that of an electric toothbrush, the latch 802 can be formed such that it can reciprocate and fit the contours of the reciprocating motor shaft for the electric toothbrush. In this way, the latch 802 and the chamber 702 can function as a key-lock type mechanism in which a key fits into its corresponding lock. In embodiments, the latch 802 can secure the reciprocating motor shaft by, for example, fitting into any holes or indentures of the reciprocating motor shaft such that the reciprocating motor shaft and the latch 802 can exert inward and outward pressures on one another sufficient to hold each other in place such that they do not come apart when the reciprocating motor shaft (e.g., from the electric toothbrush) is attached to provide the rotational and/or vibrational forces. While FIG. 8 shows one latch 802, this is not meant to be limiting. Any number of latch 802 configurations can be used and can depend on the reciprocating motor shaft design inserted into the first opening 602 and chamber 702.

Figure 9:
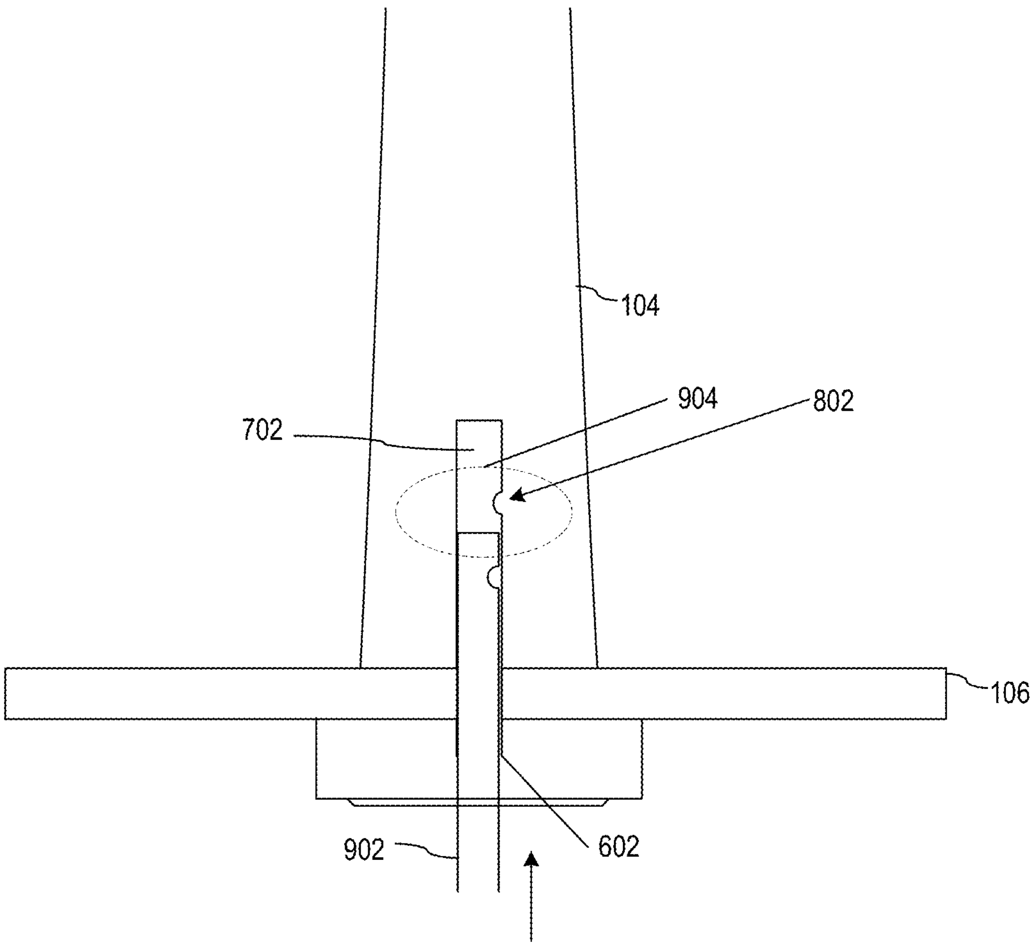
FIG. 9 is a view of the apparatus of FIG. 1 showing a reciprocating motor shaft inserted into an opening to be secured via a latch locking mechanism, in some embodiments of the present disclosure.

FIG. 9 is a view of the apparatus 100 showing an example reciprocating motor shaft 902 inserted into the first opening 602 to be secured via a locking mechanism 904 using the latch 802, in some embodiments of the present disclosure. As discussed with respect to FIG. 8, the example reciprocating motor shaft 902 can have certain contours, which the latch 802 can fit into to secure the example reciprocating motor shaft 902.

Figure 10:
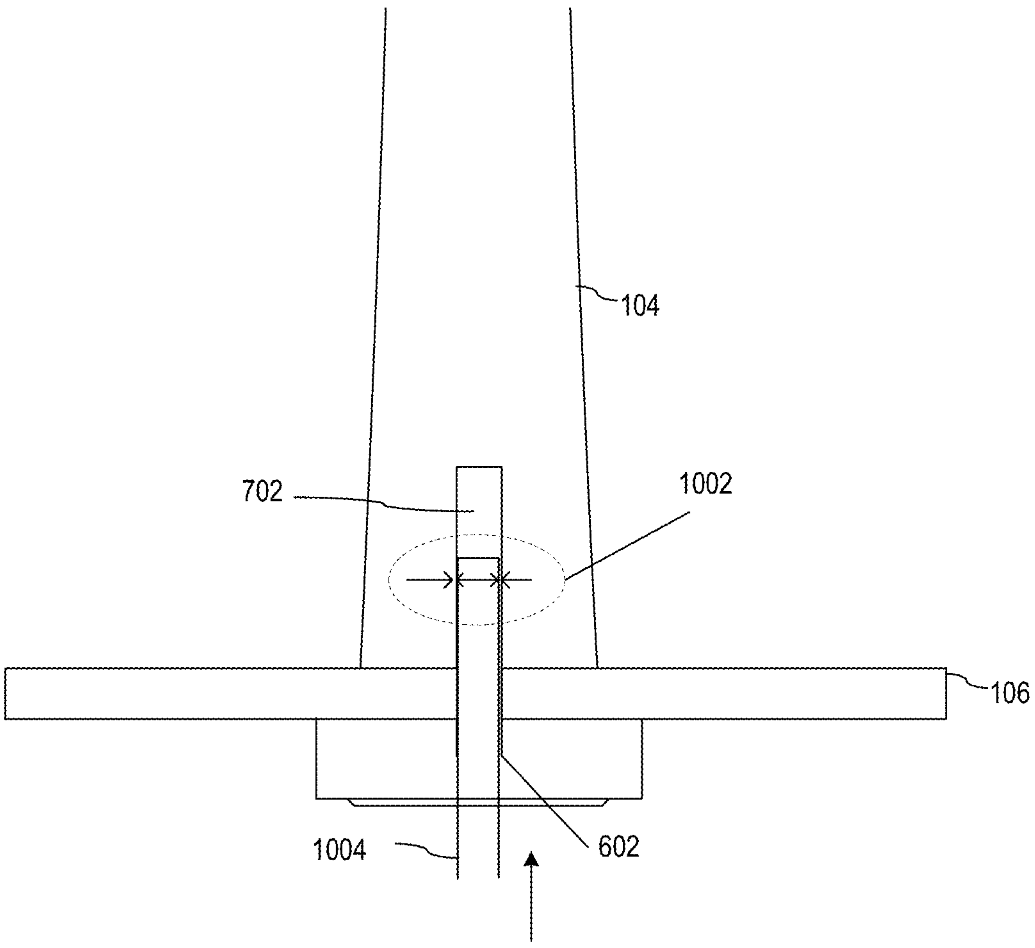
FIG. 10 is a view of the apparatus of FIG. 1 showing a reciprocating motor shaft inserted into an opening and secured via a locking mechanism configured to exert an inward pressure on the reciprocating motor shaft, in some embodiments of the present disclosure.

FIG. 10 is a view of the apparatus 100 showing an example reciprocating motor shaft 1004 inserted into the first opening 602 and secured via a locking mechanism 1002 configured to exert an inward pressure on the reciprocating motor shaft 1004, in some embodiments of the present disclosure. In embodiments, in lieu or in addition to the locking mechanism 904, the locking mechanism 1002 can be used to secure a reciprocating motor shaft to the shaft 1004. The locking mechanism 1002 can implement a similar type of technique as described above with respect to the shaft 104 and base 106 of FIG. 1 exerting inward and outward pressures on each other to secure the shaft 104 to the base 106. Similarly, the locking mechanism 1002 can allow the inner walls of the chamber 702 to exert an inward pressure on the reciprocating motor shaft 1004 to secure the reciprocating motor shaft 1004 to the shaft 104. The reciprocating motor shaft 1004 can also exert an outward pressure on the walls of the chamber 702.

The apparatus 100 described above provides an apparatus for mixing liquids and solids. In some embodiments, the apparatus 100 is configurable and uses attachable/detachable parts, for example, the head 102, the shaft 104, and the base 106, which can be assembled and re-assembled to provide the apparatus 100 for mixing. The apparatus 100 can attach to motorized devices, such as electric toothbrushes and drills that provide rotational and/or vibrational forces to rotate or vibrate the apparatus 100 to mix solids and liquids. The apparatus 100 can be used in a wide variety of cases that require the mixing of liquids and/or gels, such as the mixing of hair dyes and colors for personal use. In such cases, the apparatus 100 provides a compact, portable, and efficient means for performing such mixing of liquids and/or gels.

A benefit, among others, of the apparatus 100 is that the apparatus 100 provides a user friendly form factor. Because the apparatus 100 can be composed of components that can be easily detached and re-attached to one another—e.g., the head 102, the shaft 104, and the base 106—the apparatus 100 provides a compact, easily storable, and portable mixing apparatus.

Another benefit, among others, of the apparatus 100 is that the apparatus 100 can be customized. For example, various types and/or sizes of the head 102, shaft 104, and/or base 106 of the apparatus 100 can be combined to customize an overall configuration of the apparatus 100.

Figure 11:
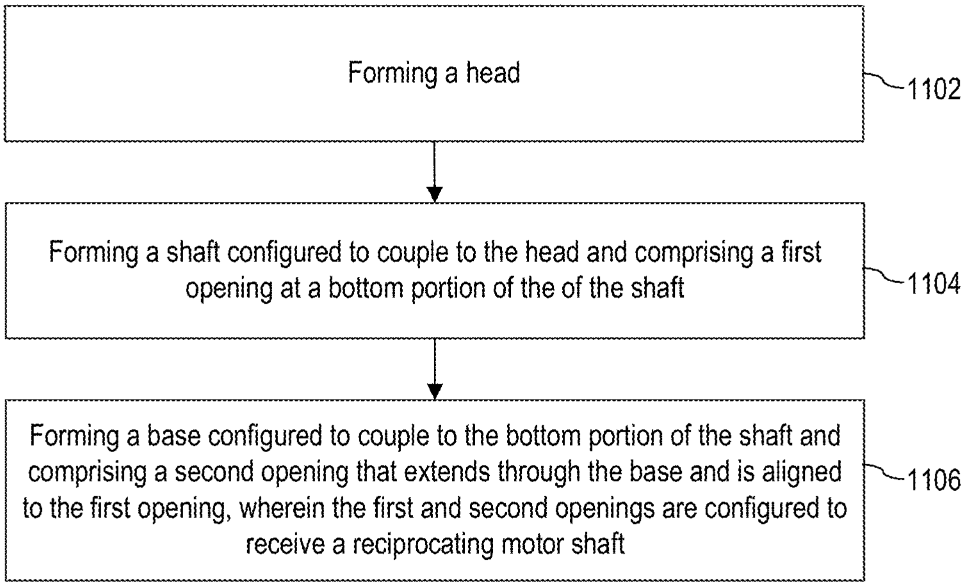
FIG. 11 is an example method of manufacturing the apparatus of FIG. 1, in some embodiments of the present disclosure.

FIG. 11 is an example method 1100 of manufacturing the apparatus 100, in some embodiments of the present disclosure. In embodiments, method 1100 may be performed to form the various components of the apparatus 100 (e.g., the head 102, shaft 104, and base 106) via a number of manufacturing techniques, as mentioned in FIG. 1, such as casting and molding, machining, joining, shearing and forming, 3-dimensional (3D) printing, or a combination thereof.

In embodiments, method 1100 can be performed by using one of the aforementioned techniques to form the head 102, shaft 104, and base 106. For example, in operation 1102, a head 102 is formed. The head 102 can be formed by casting and molding such that the head 102 is formed using the mold. Other techniques such as machining, joining, shearing and forming 3D printing, or a combination thereof can be applied to form the head 102. Materials that can be used to form the head 102 include a plastic, a metal, a rubber, or a composite material.

In operation 1104, the shaft 104 is formed. In some embodiments, the shaft 104 can be formed and configured to couple to the head 102 and/or base 106. In some embodiments, a bottom portion of the shaft 104 can include the first opening 602, which can be formed as a part of forming the shaft 104.

In operation 1106, the base 106 is formed. In some embodiments the base 106 can be formed and configured to couple to the bottom portion of the shaft 104. In some embodiments, the base 106 can include a second opening that can be formed while forming the base 106. In some embodiments, the second opening can extend through the base 106 and can be formed to align to the first opening 602, where the first opening 602 and second opening are configured to receive the reciprocating motor shaft (e.g., 902 or 1004).

In further operations, the apparatus 100 can be formed by forming the head 102 to have one or more holes 108 to allow a liquid, a solid, or a combination thereof to pass through. In further operations, the apparatus 100 can be formed by forming the first opening 602 to include a locking mechanism (e.g., 904 or 1002) to secure the reciprocating motor shaft (e.g., 902 or 1004) to the shaft 104. In further operations, the apparatus 100 can be formed by forming the base 106 to have a core section (e.g., 302) and a plate surrounding the core section, where the plate has a diameter larger than that of the core section (e.g., D3 being greater than D4).

The above description and embodiments of the disclosed apparatus 100 are not intended to be exhaustive or to limit the disclosed apparatus 100. While specific examples for the apparatus 100 are described above for illustrative purposes, various equivalent modifications are possible within the scope of the disclosed apparatus 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

It is to be appreciated that the Detailed Description section, and not the Abstract of the Disclosure section, is intended to be used to interpret the claims. The Abstract of the Disclosure section may set forth one or more but not all possible embodiments of the present disclosure as contemplated by the inventor(s), and thus, are not intended to limit the subjoined claims in any way.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the embodiments introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. An apparatus, comprising:

a head;

a shaft coupled to the head and comprising a first opening at a bottom portion of the shaft, wherein the shaft has the bottom portion and a top portion, wherein the bottom portion has a diameter at least 1.625 times larger than the top portion and is tapered;

a base having a thickness of less than or equal to 0.156 of an inch coupled to the bottom portion of the shaft and comprising:

a second opening that extends through the base and is aligned to the first opening, wherein the first and second openings are configured to receive a reciprocating motor shaft, a plate surrounding a core section, wherein the plate has a diameter that is at least 4.923 times larger than a diameter of the core section, and wherein the head, the shaft, and the base are detachable from one another;

a fastening mechanism configured to attach the head to the shaft; and an additional fastening mechanism configured to attach the shaft to the base, wherein the additional fastening mechanism comprises a screw mechanism, one or more latches, or interlocking teeth to lock the shaft to the base so that the shaft and the base move together.

2. The apparatus of claim 1, wherein the head comprises one or more holes to allow a liquid, a solid, or a combination thereof to pass through.

3. The apparatus of claim 1, wherein the head is a butterfly shape.

4. The apparatus of claim 1, wherein the shaft is a rod shape.

5. The apparatus of claim 1, wherein the base is a disc shape.

6. The apparatus of claim 1, wherein the head, the shaft, and the base comprise a metal, a plastic, a rubber, or a composite material.

7. The apparatus of claim 1, wherein the head, the shaft, and the base are each made of different materials.

8. An apparatus, comprising:

a head having a first head end and a second head end;

a shaft having a first shaft end and a second shaft end, wherein the first shaft end is coupled to the second head end, wherein the second shaft end is configured to receive at least a portion of a reciprocating motor shaft, and wherein the second shaft end has a diameter at least 1.625 times larger than the first shaft end and is tapered;

a base having a thickness of less than or equal to 0.156 of an inch and having a first base end and a second base end, wherein:

the base has an opening forming a core section of the base, the opening extending from the first base end through the second base end, and wherein the opening is configured to receive the second shaft end via the first base end, and a plate surrounding a core section, wherein the plate has a diameter that is at least 4.923 times larger than a diameter of the core section, and wherein the head, the shaft, and the base are detachable from one another;

wherein the second shaft end comprises a locking mechanism to secure the shaft to the base;

and wherein the locking mechanism comprises a screw mechanism, one or more latches, or interlocking teeth to lock the shaft to the base so that the shaft and the base move together.

9. The apparatus of claim 8, wherein the head comprises a butterfly shape.

10. The apparatus of claim 8, wherein the shaft comprises a rod shape.

11. The apparatus of claim 8, wherein the base comprises a disc shape.

12. The apparatus of claim 8, wherein the head, the shaft, and the base comprise a metal, a plastic, a rubber, or a composite material.

13. The apparatus of claim 8, wherein the head, the shaft, and the base are each made of different materials.

14. A method, comprising:

forming a head;

forming a shaft configured to couple to the head at a top portion of the shaft and comprising a first opening at a bottom portion of the shaft, wherein the bottom portion has a diameter at least 1.625 times larger than the top portion and is tapered; and forming a base having and a thickness of less than or equal to 0.156 of an inch configured to couple to the bottom portion of the shaft and comprising:

a second opening that extends through the base and is aligned to the first opening, wherein the first and second openings are configured to receive a reciprocating motor shaft, and a plate surrounding the second opening, wherein the plate has a diameter that is at least 4.923 times larger than a diameter of the second opening, and wherein the head, the shaft, and the base are detachable from one another, and forming a locking mechanism at the bottom portion of the shaft to secure the shaft to the base, wherein the locking mechanism comprises a screw mechanism, one or more latches, or interlocking teeth to lock the shaft to the base so that the shaft and the base move together.

15. The method of claim 14, wherein forming the head comprises forming one or more holes in the head to allow a liquid, a solid, or a combination thereof to pass through.

16. The method of claim 14, wherein forming the head comprises forming the head into a butterfly shape.

17. The method of claim 14, wherein forming the shaft comprises forming the shaft into a rod shape.

18. The method of claim 14, wherein forming the base comprises forming the base into a disc shape.

19. The method of claim 14, wherein the head, the shaft, and the base are formed using a metal, a plastic, a rubber, or a composite material.

20. The method of claim 14, wherein the head, the shaft, and the base are formed with each made of different materials.

* * * * *